United States Patent Office 3,137,690
Patented June 16, 1964

3,137,690
17β - HYDROXY-3-OXOANDROST-4-EN-17α-YLPRO-PIONALDEHYDE LACTOL AND Δ¹,Δ⁶,Δ¹,⁶,19-NOR AND 7α-ACETYLTHIO CONGENERS
William F. Johns, Morton Grove, Ill., assignor to G. D. Searle & Co., Chicago, Ill., a corporation of Delaware
No Drawing. Filed Sept. 26, 1963, Ser. No. 311,636
9 Claims. (Cl. 260—239.55)

This invention relates to 17β-hydroxy-3-oxoandrost-4-en-17α-ylpropionaldehyde lactol, to Δ¹,Δ⁶,Δ¹,⁶,19-nor and 7-alkanoylthio steroids otherwise identical, and to processes whereby these various but congeneric products can be manufactured. More particularly, this invention provides new, useful, and unobvious chemical compounds having the formula

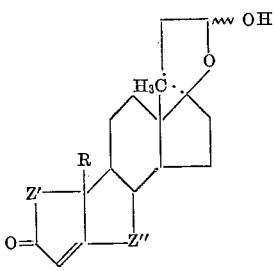

wherein Z' represents an ethylene or vinylene radical, Z" represents an ethylene, vinylene, or alkanoylthioethylene radical, and R represents a methyl radical except when Z' represents an ethylene radical, in which case R represents either hydrogen or a methyl radical.

The alkanoylthioethylene radicals represented by Z" are preferably of lower order—such as acetylthioethylene, propionylthioethylene, butyrylthioethylene, and the like—and so positioned in the steroid nucleus that the alkanoylthio constituent is in alpha configuration on carbon atom number 7, thus

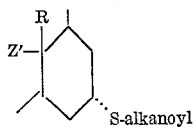

Those skilled in the art will recognize that the subject lactols are epimeric with respect to the hydroxylated carbon atom in the lactol ring. Whereas such epimers are separable by fractional crystallization, their ready interconvertibility—catalyzed by traces of either acid or base—renders isolation infeasible as a practical matter, especially in view of the purposed use of these substances (see below) in the animal body where the integrity of the separation would be evanescent.

The compounds to which this invention relates are useful by reason of their valuable pharmacological properties. Thus, for example, they block the effects of desoxycorticosterone acetate on urinary sodium and potassium.

Manufacture of the 19-methyl compounds hereof starts with, inter alia, 3β,17β-dihydroxy-17α-(3-hydroxypropyl)-androst-5-ene [J. Org. Chem., 26, 3077 (1961)], which is converted to the triacetate by heating with isopropenyl acetate in the presence of p-toluenesulfonic acid. The primary hydroxyl is selectively restored by adsorption on activated alumina in petroleum ether and oxidized with cold chromium trioxide in pyridine to give the corresponding diacetoxy aldehyde. The diacetoxy aldehyde is converted to the diacetoxy dimethyl acetal by contacting with methanol in the presence of p-toluenesulfonic acid, whereupon the acetoxy groups are cleaved by heating with ethereal lithium aluminum hydride. Oppenauer oxidation affords the corresponding 4-en-3-one, which cyclizes to 17β-hydroxy-3-oxoandrost-4-en-17α-ylpropionaldehyde lactol (a mixture of epimers, as aforesaid) on standing in aqueous acetic acid. Alternatively, the 4-en-3-one is Δ¹ dehydrogenated by heating with selenium dioxide and pyridine in tert-butyl alcohol and then cyclized with aqueous acetic acid to give 17β-hydroxy-3-oxoandrosta-1,4-diene-17α-ylpropionaldehyde lactol, or the 4-en-3-one is Δ⁶ dehydrogenated by heating with chloranil in tert-butyl alcohol and cyclized with aqueous acetic acid to 17β-hydroxy-3-oxoandrosta-4,6-diene-17α-ylpropionaldehyde lactol. From 17β-hydroxy-3-oxoandrosta-4,6-diene-17α-ylpropionaldehyde dimethyl acetal, on heating with selenium dioxide and pyridine in tert-butyl alcohol followed by aqueous acetic acid cyclization, 17β-hydroxy-3-oxoandrosta-1,4,6-triene-17α-ylpropionaldehyde lactol is obtained; and 17β-hydroxy-3-oxoandrosta-4,6-diene-17α-ylpropionaldehyde lactol affords 7α-alkanoylthio-17β-hydroxy-3-oxoandrost-4-en-17α-ylpropionaldehyde lactol on contact with an appropriate thioalkanoic acid. Likewise, 17β-hydroxy-3-oxoandrosta-1,4,6-triene-17α-ylpropionaldehyde lactol affords 7α-alkanoylthio-17β-hydroxy-3-oxoandrosta-1,4-diene-17α-ylpropionaldehyde lactol on contact with thioalkanoic acid.

The 19-nor compounds of this invention eventuate from 3-(17β-hydroxy-3-methoxyestra-1,3,5(10)-trien-17α-yl)propionic acid lactone (U.S. 2,875,199), which is reduced to 17β-hydroxy-17α-(3-hydroxypropyl)-3-methoxyestra-1,3,5(10)-triene with lithium aluminum hydride in boiling ethereal tetrahydrofuran. Heating the diol thus obtained with isopropenyl acetate and p-toluenesulfonic acid gives the diester, which is heated with aqueous methanolic potassium bicarbonate to regenerate the primary hydroxyl. The hydroxyl is oxidized to an aldehyde group with cold chromium trioxide in pyridine, whereupon the dimethyl acetal is formed by contacting with methanol and p-toluenesulfonic acid. Reduction with lithium in a mixture of liquid ammonia and tert-butyl alcohol affords the corresponding 2,5(10)-diene, from which 17β-hydroxy-3-oxoestra-4-en-17α-ylpropionaldehyde lactol is obtained on contact with aqueous acetic acid. The Δ⁶ derivative derives by cyclizing with methyl orthoformate and p-toluenesulfonic acid in dioxane, oxidizing the resulting lactolide with manganese dioxide in benzene, and finally hydrolyzing the lactolide with aqueous acetic acid. Interaction of 17β-hydroxy-3-oxoetra-4,6-dien-17α-ylpropionaldehyde lactol and thioalkanoic acid affords the corresponding 7α-alkanoylthio-17β-hydroxy-3-oxoestra-4-en-17α-ylpropionaldehyde lactol.

The following examples describe in detail compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted. Specific rotations were determined in chloroform solution (1%) at room temperatures and refer to the D line of sodium.

*Example 1*

A. *3β,17β - diacetoxy - 17α-(3 - acetoxypropyl)androst-5-ene.*—A mixture of 780 parts of 3β,17β-dihydroxy-17α-(3-hydroxypropyl)androst-5-ene, 19 parts of p-toluenesulfonic acid, and approximately 7000 parts of isopropenyl acetate is distilled to ½ volume during 3 hours, then filtered. The filtrate is partitioned between benzene and water. The benzene phase is consecutively washed with aqueous potassium bicarbonate and water, then dried over anhydrous magnesium sulfate and stripped of solvent by vacuum distillation. The residue is crystallized from methanol to give 3β,17β-diacetoxy-17α-(3-acetoxypropyl)androst-5-ene melting at approximately 115–116°, and further characterized by a specific rotation of −76°.

B. *3β,17β - diacetoxy - 17α - (3-hydroxypropyl)androst-5-ene.*—An anhydrous solution of 80 parts of 3β,17β-diacetoxy-17α-(3-acetoxypropyl)androst-5-ene in 880 parts of benzene is adsorbed on approximately 2300 parts of activated alumina packed in a column of petroleum ether. The column is eluted with approximately 3500 parts of benzene, then allowed to stand 16 hours and again eluted with approximately 3500 parts of benzene, followed by approximately 4300 parts of ether and, finally, 5400 parts of ethyl acetate. From the ethyl acetate eluate, on evaporation of solvent, there is obtained as the residue, 3β,17β-diacetoxy-17α-(3-hydroxypropyl)androst-5-ene which, recrystallized from petroleum ether, melts at approximately 104–105°. The product is further characterized by a specific rotation of −85°.

C. *3β,17β - diacetoxyandrost - 5 - en - 17α - ylpropionaldehyde.*—To a slurry of 100 parts of chromium trioxide in 1000 parts of pyridine is added a solution of 102 parts of 3β,17β-diacetoxy-17α-(3-hydroxypropyl)androst-5-ene in 1000 parts of pyridine, temperatures of the order of 5° being maintained throughout the addition and for 65 hours thereafter. The resultant mixture is partitioned between water and ether. The ether phase is dried over anhydrous magnesium sulfate and stripped of solvent by vacuum distillation. The residue is taken up in benzene and chromatographed on silica gel, using benzene and ethyl acetate as developing solvents. From an eluate comprising 5% ethyl acetate in benzene, on distillation of solvent, there is obtained as the residue, 3β,17β-diacetoxy-androst-5-en-17α-ylpropionaldeyde.

D. *3β,17β - diacetoxyandrost - 5 - en - 17α - ylpropionaldehyde dimethyl acetal.*—A solution of 90 parts of 3β,17β-diacetoxyandrost-5-en-17α-ylpropionaldehyde and 2 parts of p-toluenesulfonic acid in 790 parts of methanol is allowed to stand at room temperatures for 25 minutes, then filtered. The filtrate is made alkaline with aqueous potassium bicarbonate and thereupon extracted with benzene. The benzene extract is washed with water, dried over anhydrous magnesium sulfate, and stripped of solvent by vacuum distillation. The residue is taken up in benzene and chromatographed on silica gel, using benzene and ethyl acetate as developing solvents. From an eluate comprising 5% ethyl acetate in benzene, on distillation of solvent, there is obtained as the residue, 3β,17β-diacetoxy-androst-5-en-17α-ylpropionaldehyde dimethyl acetal.

E. *3β,17β - dihydroxyandrost - 5 - en - 17α - ylpropionaldehyde dimethyl acetal.*—To a solution of 75 parts of lithium aluminum hydride in 7000 parts of ether is added, with agitation during approximately 10 minutes, a solution of 305 parts of 3β,17β-diacetoxyandrost-5-en-17α-ylpropionaldehyde dimethyl acetal in 7000 parts of ether. The resultant mixture is heated at the boiling point under reflux for 30 minutes and then cooled, whereupon sufficient water is slowly introduced to destroy excess hydride. Approximately 100 parts of aqueous 10% potassium hydroxide is then mixed in, whereupon the ethereal phase is separated, dried over anhydrous magnesium sulfate, and stripped of solvent by distillation. The residue, on recrystallization from ether, affords 3β,17β-dihydroxyandrost-5-en-17α-ylpropionaldehyde dimethyl acetal melting at approximately 146–147°.

F. *17β-hydroxy - 3 - oxoandrost - 4 - en - 17α-ylpropionaldehyde dimethyl acetal.*—To a solution of 12 parts of 3β,17β - dihydroxyandrost-5-en-17α-ylpropionaldehyde dimethyl acetal in a mixture of 1350 parts of toluene and 50 parts of redistilled cyclohexanone at the boiling point under reflux in a nitrogen atmosphere is added, with agitation, 27 parts of toluene containing 6 parts of aluminum isopropoxide. Heating at the boiling point under reflux with agitation in a nitrogen atmosphere is continued for an additional 15 minutes, whereupon approximately 500 parts of saturated Rochelle salt solution is introduced and the resultant mixture vigorously steamed distilled for 90 minutes. The distilland is partitioned between water and benzene. The benzene phase is separated, consecutively washed with aqueous potassium bicarbonate and water, dried over anhydrous magnesium sulfate, and stripped of solvent by vacuum distillation. The residue, upon recrystallization from ether, affords 17β-hydroxy-3-oxoandrost-4-en-17α-ylpropionaldehyde dimethyl acetal melting at 143–145°.

G. *17β - hydroxy-3-oxoandrost-4-en-17α-ylpropionaldehyde lactol.*—A solution of 35 parts of 17β-hydroxy-3-oxoandrost-4-en-17α-ylpropionaldehyde dimethyl acetal in 2000 parts of aqueous 70% acetic acid is allowed to stand at room temperatures for 3 hours and then diluted with sufficient water to precipitate a crystalline product. The product, isolated by filtration and further purified by recrystallization from a mixture of ether and petroleum ether, is 17β-hydroxy - 3 - oxoandrost-5-en-17α-ylpropionaldehyde lactol melting at 139–141°. The product has the formula

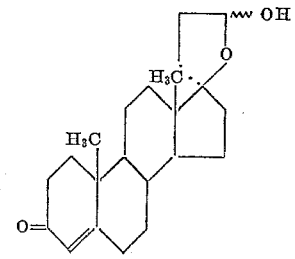

*Example 2*

A. *17β-hydroxy-3-oxoandrosta-1,4-dien-17α-ylpropionaldehyde dimethyl acetal.*—A solution of 30 parts of 17β-hydroxy - 3 - oxoandrost-4-en-17α-ylpropionaldehyde dimethyl acetal and 16 parts of selenium dioxide in approximately 3100 parts of tert-butyl alcohol containing 10 parts of pyridine is heated at the boiling point under reflux for 24 hours. The resultant mixture is filtered through infusorial earth, and the filtrate is stripped of solvent by vacuum distillation. The residue is taken up in chloroform; and the chloroform solution is consecutively washed with water and aqueous potassium bicarbonate, then stripped of solvent by vacuum distillation. The residue thus obtained is dissolved in benzene and chromatographed on silica gel, using benzene and ethyl acetate as developing solvents. From an eluate comprising 10% ethyl acetate in benzene, on evaporation of solvent, there is obtained 17β-hydroxy-3-oxoandrosta-1,4-dien-17α-ylpropionaldehyde dimethyl acetal as the residue.

B. *17β-hydroxy-3-oxoandrosta-1,4-dien-17α-ylpropionaldehyde lactol.*—A solution of 1 part of 17β-hydroxy-3-oxoandrosta - 1,4-dien-17α-ylpropionaldehyde dimethyl acetal in 4 parts of aqueous 70% acetic acid is allowed to stand at room temperatures for 3 hours, then precipitated with excess water. The precipitate is collected on a filter and dried in air. The product thus isolated is 17β-hydroxy - 3-oxoandrosta-1,4-dien-17α-ylpropionaldehyde lactol, having the formula

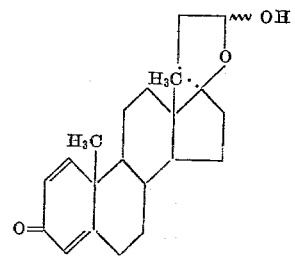

Example 3

A. *17β-hydroxy-3-oxoandrosta-4,6-dien-17α-ylpropionaldehyde dimethyl acetal.*—A mixture of 10 parts of 17β-hydroxy - 3 - oxoandrost-4-en-17α-ylpropionaldehyde dimethyl acetal and 37 parts of chloranil in 2800 parts of tert-butyl alcohol is heated at the boiling point under reflux with agitation for 3 hours, then filtered. The filtrate is stripped of solvent by vacuum distillation. The residue is 17β-hydroxy - 3 - oxoandrosta-4,6-dien-17α-ylpropionaldehyde dimethyl acetal.

B. *17β-hydroxy-3-oxoandrosta-4,6-dien-17α-ylpropionaldehyde lactol.*—A solution of 5 parts of 17β-hydroxy-3-oxoandrosta - 4,6 - dien-17α-ylpropionaldehyde dimethyl acetal in 300 parts of aqueous 70% acetic acid is allowed to stand at room temperatures for 3 hours. Sufficient water is thereupon introduced to effect precipitation. The solid product thrown down is filtered off and dried in air. The material thus isolated is 17β-hydroxy-3-oxoandrosta-4,6-dien-17α-ylpropionaldehyde lactol, having the formula

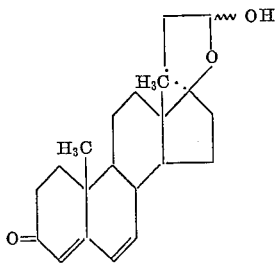

Example 4

A. *17β - hydroxy-3-oxoandrosta-1,4,6-trien-17α-ylpropionaldehyde dimethyl acetal.*—A mixture of 10 parts of 17β - hydroxy-3-oxoandrosta-4,6-dien-17α-ylpropionaldehyde dimethyl acetal, 5 parts of selenium dioxide, 2 parts of pyridine, and 800 parts of tert-butyl alcohol is heated at the boiling point under reflux in a nitrogen atmosphere for 36 hours, then diluted with 900 parts of ethyl acetate and filtered through infusorial earth. The filtrate is stripped of solvent by vacuum distillation. The residue is taken up in benzene and chromatographed on silica gel, using benzene and ethyl acetate as developing solvents. From an eluate comprising 10% ethyl acetate in benzene, on evaporation of solvent, there is obtained as the residue, 17β - hydroxy - 3 - oxoandrosta-1,4,6-trien-17α-ylpropionaldehyde dimethyl acetal.

B. *17β - hydroxy-3-oxoandrosta-1,4,6-trien-17α-ylpropionaldehyde lactol.*—Substitution of 1 part of 17β-hydroxy - 3 oxoandrosta-1,4,6-trien-17α-ylpropionaldehyde dimethyl acetal for the 17β-hydroxy-3-oxoandrosta-1,4-dien-17α-ylpropionaldehyde dimethyl acetal called for in Example 2B affords, by the procedure there detailed, 17β-hydroxy - 3 - oxoandrosta-1,4,6-trien-17a-ylpropionaldehyde lactol, having the formula

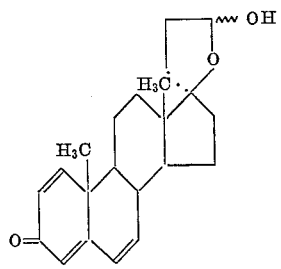

Example 5

*7α - acetylthio-17β-hydroxy-3-oxoandrost-4-en-17α-ylpropionaldehyde lactol.*—A mixture of 10 parts of 17β-hydroxy - 3-oxoandrosta-4,6-dien-17α-ylpropionaldehyde lactol and 10 parts of thioacetic acid is maintained with agitation at room temperatures for 24 hours. Excess acid is thereupon removed by vacuum distillation at room temperatures. The residue crystallizes on trituration with methanol. The crystalline product is separated by filtration and dried in air. The material thus isolated is 7α-acetylthio - 17β - hydroxy-3-oxoandrost-4-en-17α-ylpropionaldehyde lactol, having the formula

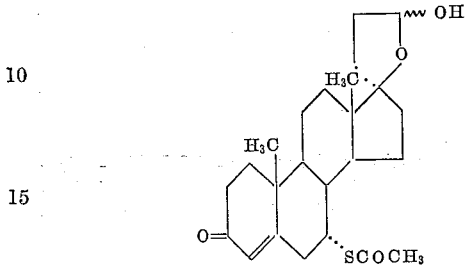

Example 6

*7α - acetylthio - 17β - hydroxy - 3 - oxoandrosta - 1,4-dien-17α-ylpropionaldehyde lactol.*—A mixture of 1 part of 17β-hydroxy-3-oxoandrosta-1,4,6-trien-17α-ylpropionaldehyde lactol and 2 parts of thioacetic acid is maintained with agitation at room temperatures for 24 hours. Excess acid is thereupon removed by vacuum distillation at room temperatures. The residue is triturated with methanol. The resultant crystalline precipitate is separated by filtration and dried in air. The product thus isolated is 7α - acetylthio - 17β-hydroxy-3-oxoandrosta-1,4-dien-17α-ylpropionaldehyde lactol, having the formula

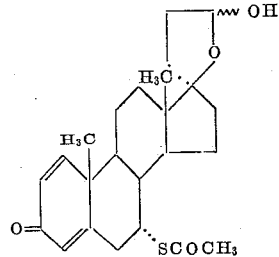

Example 7

A. *17β - hydroxy - 17α - (3 - hydroxypropyl) - 3 - methoxyestra-1,3,5(10)-triene.*—To a solution of 10 parts of lithium aluminum hydride in 700 parts of ether is added, with agitation during 10 minutes, a solution of 17 parts of 3-(17β-hydroxy-3-methoxyestra-1,3,5(10)-triene-17α-yl)propionic acid lactone in 270 parts of tetrahydrofuran and 700 parts of ether. The resultant mixture is heated at the boiling point with continued agitation for 4 hours, whereupon excess hydride is decomposed with ethyl acetate. To the mixture thus obtained is consecutively added 30 parts of water and 10 parts of aqueous 10% potassium hydroxide. Upon filtration and vacuum distillation of solvent from the filtrate, one obtains 17β-hydroxy - 17α - (3 - hydroxypropyl) - 3 - methoxyestra-1,3,5(10)-triene.

B. *17β - acetoxy - 17α - (3 - acetoxypropyl) - 3 - methoxyestra - 1,3,5(10)-triene.*—A solution of 15 parts of 17β - hydroxy-17α-(3-hydroxypropyl)-3-methoxyestra-1,3,5(10)-triene and 6 parts of p-toluenesulfonic acid in approximately 2700 parts of isopropenyl acetate is distilled to ½ volume during 3 hours, then filtered and partitioned between ether and aqueous potassium bicarbonate. The ethereal phase is separated, washed with water, dried over anhydrous magnesium sulfate, and stripped of solvent by vacuum distillation. The residue is taken up in benzene and chromatographed on silica gel, using benzene and ethyl acetate as developing solvents. From an eluate comprising 2% ethyl acetate in benzene, on evaporation of solvent and recrystallization of the residue from aqueous methanol, there is obtained 17β-acetoxy-17α-(3- acetoxypropyl) - 3 - methoxyestra - 1,3,5(10) - triene melting at approximately 88–89°.

C. *17β - acetoxy - 17α - (3 - hydroxypropyl) - 3 - methoxyestra - 1,3,5(10) - triene.*—A mixture of a solution of 23 parts of 17β-acetoxy-17α-(3-acetoxypropyl)-3-methoxyestra-1,3,5(10)-triene in 1600 parts of methanol with a solution of 50 parts of potassium bicarbonate in 200 parts of water is heated at the boiling point under reflux for 1 hour, then precipitated with water. The precipitate is filtered off and recrystallized from a mixture of acetone and petroleum ether to give 17β-acetoxy-17α-(3-hydroxypropyl)-3-methoxyestra-1,3,5(10)-triene melting at 163–165°.

D. *17β - acetoxy - 3 - methoxyestra - 1,3,5(10) - trien-17α-ylpropionaldehyde.*—To a slurry of 70 parts of chromium trioxide in 700 parts of pyridine is added, with agitation at temperatures not to exceed 5°, a solution of 45 parts of 17β-acetoxy-17α-(3-hydroxypropyl)-3-methoxyestra-1,3,5(10)-triene in 300 parts of pyridine. The resultant mixture is allowed to warm to room temperatures over 2 hours with agitation, then partitioned between water and ether. The ethereal phase is separated, dried over anhydrous magnesium sulfate, and stripped of solvent by vacuum distillation. The residue is taken up in benzene and chromatographed on silica gel, using benzene and ethyl acetate as developing solvents. From an eluate comprising 2% ethyl acetate in benzene, on evaporation of solvent and recrystallization of the residue from a mixture of ether and petroleum ether, there is obtained 17β - acetoxy - 3 - methoxyestra - 1,3,5(10) - trien - 17α-ylpropionaldehyde melting at approximately 142–143°.

E. *17β - acetoxy - 3 - methoxyestra - 1,3,5(10) - trien-17α-ylpropionaldehyde dimethyl acetal.*—To a slurry of 25 parts of 17β-acetoxy-3-methoxyestra-1,3,5(10)-triene-17α-ylpropionaldehyde in 400 parts of methanol is added 3 parts of p-toluenesulfonic acid. Solution occurs. Excess aqueous potassium bicarbonate is added, and the solid precipitate thrown down is collected on a filter. The product thus isolated is 17β-acetoxy-3-methoxyestra-1,3,5(10)-trien-17α-ylpropionaldehyde dimethyl acetal.

F. *17β - hydroxy - 3 - methoxyestra - 2,5(10) - dien-17α-ylpropionaldehyde dimethyl acetal.*—To a mixture of 240 parts of liquid ammonia and 120 parts of tert-butyl alcohol is added a solution of 10 parts of 17β-acetoxy-3-methoxyestra-1,3,5(10)-trien-17α-ylpropionaldehyde dimethyl acetal in 135 parts of tetrahydrofuran. To the resultant mixture is added, with vigorous agitation, 4 one-part portions of lithium wire during 1 hour. After 3 hours, sufficient methanol (approximately 16 parts) is introduced to decolorize the mixture, whereupon the ammonia is distilled off and the distilland partitioned between water and benzene. The benzene phase is dried over anhydrous magnesium sulfate and chromatographed on alumina to give 17β-hydroxy-3-methoxyestra-2,5(10)-dien-17α-ylpropionaldehyde dimethyl acetal.

G. *17β - hydroxy - 3 - oxoestra - 4 - en - 17α - ylpropionaldehyde lactol.*—A solution of 1 part of 17β-hydroxy - 3- methoxyestra-2,5(10)-dien-17α-ylpropionaldehyde dimethyl acetal in 4 parts of aqueous 70% acetic acid is allowed to stand at room temperatures for 3 hours, then precipitated with water. The solid product thrown down is 17β-hydroxy-3-oxoestra-4-en-17α-ylpropionaldehyde lactol, which is isolated by filtration and dried in air. The product has the formula

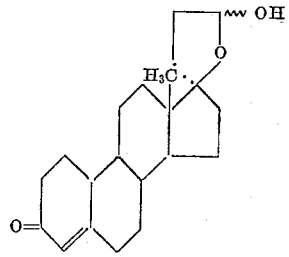

*Example 8*

A. *17β - hydroxy-3-methoxyestra-3,5-dien-17α-ylpropionaldehyde methyl lactolide.*—To a solution of 10 parts of 17β - hydroxy - 3-oxoestra-4-en-17α-ylpropionaldehyde lactol in 200 parts of dioxane and 45 parts of methyl orthoformate is added 1 part of p-toluene-sulfonic acid. The resultant mixture is allowed to stand at room temperatures for 30 minutes, then diluted with 100 parts of pyridine followed by 1000 parts of water. The crystalline product which precipitates is 17β-hydroxy-3-methoxyestra-3,5-dien-17α-ylpropionaldehyde methyl lactolide. The product is isolated by filtration and dried in air.

B. *17β-hydroxy-3-oxoestra-4,6-dien-17α-ylpropionaldehyde methyl lactolide.*—A mixture of 1 part of 17β-hydroxy - 3 - methoxyestra-3,5-dien-17α-ylpropionaldehyde methyl lactolide, 5 parts of manganese dioxide, and approximately 90 parts of benzene is maintained with agitation at room temperatures for 1 hour, then filtered. The filtrate is stripped of solvent by vacuum distillation. The residue is taken up in benzene and chromatographed on silica gel, using benzene and ethyl acetate as developing solvents. From an eluate comprising 10% ethyl acetate in benzene, on evaporation of solvent, there is obtained 17β-hydroxy-3-oxoestra-4,6-dien-17α-ylpropionaldehyde methyl lactolide.

C. *17β-hydroxy-3-oxoestra-4,6-dien-17α-ylpropionaldehyde lactol.*—A mixture of 1 part of 17β-hydroxy-3-oxoestra-4,6-dien-17α-ylpropionaldehyde methyl lactolide and 65 parts of aqueous 70% acetic acid is maintained with agitation at room temperatures for 3 hours. Sufficient water is thereupon introduced to effect precipitation. The precipitate is collected on a filter and dried in air. The product thus isolated is 17β-hydroxy-3-oxoestra-4,6-dien-17α-ylpropionaldehyde lactol, having the formula

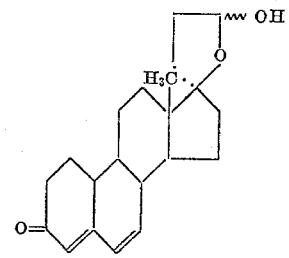

*Example 9*

*7α - acetylthio - 17β-hydroxy-3-oxoestra-4-en-17α-ylpropionaldehyde lactol.*—A mixture of 1 part of 17β-hydroxy - 3 - oxoestra-4,6-dien-17α-ylpropionaldehyde lactol and approximately 2 parts of thioacetic acid is maintained with agitation at room temperatures for 24 hours. Excess acid is thereupon removed by distillation in vacuo at substantially room temperatures. The residue is crystallized by trituration with methanol. The crystalline precipitate is filtered off and dried in air. The product thus isolated is 7α-acetylthio-17β-hydroxy-3-oxoestra-4-en-17α-ylpropionaldehyde lactol, having the formula

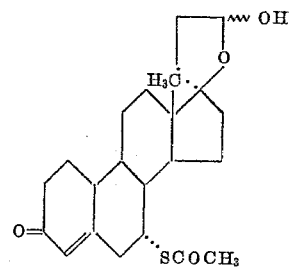

What is claimed is:
1. A compound of the formula

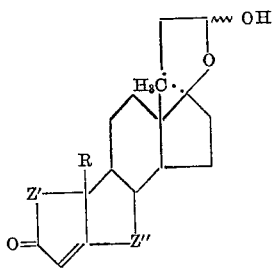

wherein Z' is selected from the group consisting of ethylene and vinylene radicals, Z" is selected from the group consisting of ethylene, vinylene, and acetyl thioethylene radicals so positioned in the steroid nucleus that the acetylthio constituent is in alpha configuration on carbon atom number 7, and R is a methyl radical except when Z' is an ethylene radical, in which case R is selected from the group consisting of hydrogen and the methyl radical.

2. 17β - hydroxy-3-oxoandrost-4-en-17α-ylpropionaldehyde lactol.
3. 17β - hydroxy-3-oxoandrosta-1,4-dien-17α-ylpropionaldehyde lactol.
4. 17β - hydroxy - 3 - oxoandrosta-4,6-dien-17α-ylpropionaldehyde lactol.
5. 17β - hydroxy - 3 - oxandrosta-1,4,6-trien-17α-ylpropionaldehyde lactol.
6. 7α - acetylthio - 17β - hydroxy-3-oxoandrost-4-en-17α-ylpropionaldehyde lactol.
7. 7α - acetylthio-17β-hydroxy-3-oxoandrosta-1,4-dien-17α-ylpropionaldehyde lactol.
8. 3β,17β - diacetoxyandrost - 5 - en - 17α - ylpropionaldehyde.
9. 17β - acetoxy - 3 - methoxyestra - 1,3,5(10) - trien-17α-ylpropionaldehyde.

References Cited in the file of this patent
UNITED STATES PATENTS

| | | |
|---|---|---|
| 3,083,200 | Patchett et al. | Mar. 26, 1963 |
| 3,103,510 | Patchett | Sept. 10, 1963 |

UNITED STATES PATENT OFFICE
CERTIFICATE OF CORRECTION

Patent No. 3,137,690    June 16, 1964

William F. Johns

It is hereby certified that error appears in the above numbered patent requiring correction and that the said Letters Patent should read as corrected below.

Column 1, lines 39 to 44, the formula should appear as shown below instead of as in the patent:

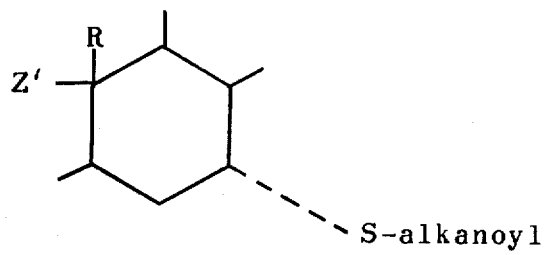

column 2, line 46, for "-oxoetra-" read -- -oxoestra- --; column 8, line 6, for "toluene-sulfonic" read -- toluenesulfonic --; column 9, line 16, for "acetyl thioethylene" read -- acetylthioethylene --; column 10, line 7, for "-oxandrosta-" read -- -oxoandrosta- --.

Signed and sealed this 22nd day of December 1964.

(SEAL)
Attest:

ERNEST W. SWIDER
Attesting Officer

EDWARD J. BRENNER
Commissioner of Patents